(12) United States Patent
Kikuchi

(10) Patent No.: US 11,604,066 B2
(45) Date of Patent: Mar. 14, 2023

(54) COMMUNICATION MANAGEMENT SYSTEM OF SURVEYING INSTRUMENT

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 385 days.

(21) Appl. No.: 16/870,316

(22) Filed: May 8, 2020

(65) Prior Publication Data

US 2020/0363204 A1 Nov. 19, 2020

(30) Foreign Application Priority Data

May 15, 2019 (JP) .............................. JP2019-091920

(51) Int. Cl.
| | |
|---|---|
| *G06Q 10/00* | (2012.01) |
| *G06Q 20/10* | (2012.01) |
| *G01C 3/04* | (2006.01) |
| *G01C 15/06* | (2006.01) |
| *H04W 4/80* | (2018.01) |

(52) U.S. Cl.
CPC .............. *G01C 15/06* (2013.01); *H04W 4/80* (2018.02)

(58) Field of Classification Search
CPC .... G06Q 10/20; G06Q 20/065; G06Q 20/105; G06Q 10/00; G06Q 20/06; G06Q 20/10; G01C 25/00; G01C 15/002; G01C 3/04; G01C 15/06; G08B 25/10; H04W 4/80
See application file for complete search history.

(56) References Cited

U.S. PATENT DOCUMENTS

| | | | |
|---|---|---|---|
| 2012/0133918 A1* | 5/2012 | Sakimura | ............. G01C 15/002 356/4.01 |
| 2019/0004157 A1 | 1/2019 | Kikuchi | |
| 2020/0043310 A1 | 2/2020 | Kikuchi et al. | |
| 2020/0143647 A1 | 5/2020 | Kikuchi et al. | |

FOREIGN PATENT DOCUMENTS

| | | |
|---|---|---|
| JP | 2019007903 A | 1/2019 |
| JP | 2019007904 A | 1/2019 |
| JP | 2019009703 A | 1/2019 |

* cited by examiner

*Primary Examiner* — Deeprose Subedi
(74) *Attorney, Agent, or Firm* — Thomas W. Cole; Calderon Safran & Cole P.C.

(57) ABSTRACT

Provided is a communication management system of a surveying instrument, which enables management by a management server through a communication network even when the surveying instrument has no communication function with the management server through the communication network. A communication management system of a surveying instrument includes a management server, a terminal including a terminal control unit and capable of communicating with the management server through a communication network, and a surveying instrument including a control unit, wherein when the surveying instrument and the terminal are connected to each other through their respective external interfaces, the terminal control unit makes the control unit install an operation execution program for executing a predetermined operation in the surveying instrument, the terminal transmits data output from the surveying instrument by execution of the operation execution program to the management server, and the management server manages the surveying instrument based on the received data.

12 Claims, 12 Drawing Sheets

60

COMMUNICATION MANAGEMENT SYSTEM OF SURVEYING INSTRUMENT

CROSS-REFERENCE TO RELATED APPLICATION

The present application claims priority under 35 U.S.C. § 119 to Japanese Patent Application No. 2019-091920 filed May 15, 2019. The contents of this application are incorporated herein by reference in their entirely.

TECHNICAL FIELD

The present invention relates to a communication management system of a surveying instrument.

BACKGROUND

Conventionally, a communication management system of a surveying instrument has been proposed in which a surveying instrument such as a total station, transit, digital level, etc., a management server, and a remote terminal are configured so as to be capable of communicating with each other through a communication network, the management server acquires various data from the surveying instrument, the acquired data are accumulated in the management server, and based on the acquired data, the management server makes determination, and based on the determination result, functions of the surveying instrument are suspended or an administrator of the surveying instrument is brought to attention (refer to JP2019-009703A, JP2019-007903A, JP2019-007904A).

As an example, JP2019-009703A discloses a communication management system of a surveying instrument, which includes a total station equipped with a GPS device (GNSS device), a management server capable of communicating with the total station through a communication network, and a remote terminal capable of communicating with the management server. With the communication management system, a usable range of the surveying instrument is set from the remote terminal and the GPS device acquires positional information of the surveying instrument. When finding deviation from the usable range based on the positional information, the management server locks functions of the surveying instrument and transmits an e-mail to the administrator to prevent an unauthorized use of the surveying instrument.

SUMMARY OF THE INVENTION

However, the communication management system described above is usable only in state-of-the-art models having a communication function to communicate with a management server through a communication network, and when using an old model that does not have such a function, a problem occurs in which provision of services using the communication management system described above cannot be provided.

Many of the currently used surveying instruments include an external interface such as a USB (Universal Serial Bus) to output measurement data. Therefore, use of a communication management system of a surveying instrument through such an external interface has been demanded.

The present invention was made in view of the above-described circumstances, and an object thereof is to provide a communication management system of a surveying instrument, which enables management using a management server through a communication network even when a surveying instrument does not have a communication function to communicate with the management server through a communication network.

In order to achieve the above-described object, a communication management system of a surveying instrument according to an aspect of the present invention includes a management server, a terminal including a terminal control unit and an external interface, and configured so as to be capable of communicating with the management server through a communication network, and a surveying instrument including a survey unit for surveying a measuring object, a control unit for controlling the survey unit, and an external interface, wherein when the surveying instrument and the terminal are connected to each other through their respective external interfaces, the terminal control unit makes the control unit install an operation execution program for executing a predetermined operation in the surveying instrument, the operation execution program includes a first operation execution program for outputting predetermined data to the terminal, the terminal transmits the data output from the surveying instrument by execution of the first operation execution program to the management server, and the management server manages the surveying instrument based on data received from the terminal.

A communication management system of a surveying instrument according to another aspect of the present invention includes a management server, a terminal including a terminal control unit and an external interface, and configured so as to be capable of communicating with the management server through a communication network, and a surveying instrument including a survey unit for surveying a measuring object, a control unit for controlling the survey unit, and an external interface, wherein when the surveying instrument and the terminal are connected to each other through their respective external interfaces, the terminal control unit executes an operation execution program for executing a predetermined operation, the operation execution program includes a first operation execution program for reading out predetermined data from the surveying instrument, the terminal transmits data acquired from the surveying instrument by execution of the first operation execution program to the management server, and the management server manages the surveying instrument based on data received from the terminal.

A communication management system of a surveying instrument according to still another aspect of the present invention includes a management server, a terminal including an external interface, and configured so as to be capable of communicating with the management server through a communication network, a surveying instrument including a survey unit for surveying a measuring object, a control unit for controlling the survey unit, and an external interface, and a connection adapter including an adapter control unit, an adapter input unit, and an adapter output unit, and configured so as to communicatively connect the surveying instrument and the terminal through the external interfaces, wherein when the surveying instrument and the terminal are connected to each other through the connection adapter, the connection adapter makes the control unit install a first operation execution program for executing a predetermined operation in the surveying instrument, or executes a first operation execution program for executing a predetermined operation, the terminal transmits the data acquired by execution of either of the programs to the management server, and the management server manages the surveying instrument based on data received from the terminal.

In each of the aspects described above, it is also preferable that the operation execution program includes a second operation execution program for suspending functions of the surveying instrument when a defined period of time elapses from the previous communication of the surveying instrument with the management server through the terminal.

In each of the aspects described above, it is also preferable that the data from the surveying instrument is associated with specific information of the surveying instrument and transmitted to the management server, and the management server manages the data by linking the specific information to a management number of the surveying instrument.

In each of the aspects described above, it is also preferable that each of the external interfaces of the surveying instrument and the terminal is a Universal Serial Bus or Bluetooth®.

BENEFIT OF THE INVENTION

According to a communication management system of a surveying instrument according to the aspect described above, a communication management system of a surveying instrument can be provided which enables management using a management server through a communication network even when a surveying instrument does not have a communication function to communicate with the management server through a communication network.

DESCRIPTION OF EMBODIMENTS

Hereinafter, preferred embodiments of the present invention are described with reference to the drawings, however, the present invention is not limited to these. In particular, in the following description, an example of application of the present invention to the communication management system described in JP2019-009703A is described, in which a surveying instrument transmits positional information thereof to a management server at fixed time intervals, and the management server determines whether the surveying instrument deviates from a predetermined range so as to perform locking of functions of the surveying instrument, etc. based on the result of the determination. However, the present invention is widely applicable to communication management systems each including a surveying instrument and a management server. In each of the embodiments, the same components are provided with the same reference sign, and redundant description is omitted.

First Embodiment (Entire Configuration of System)

Figure 1:
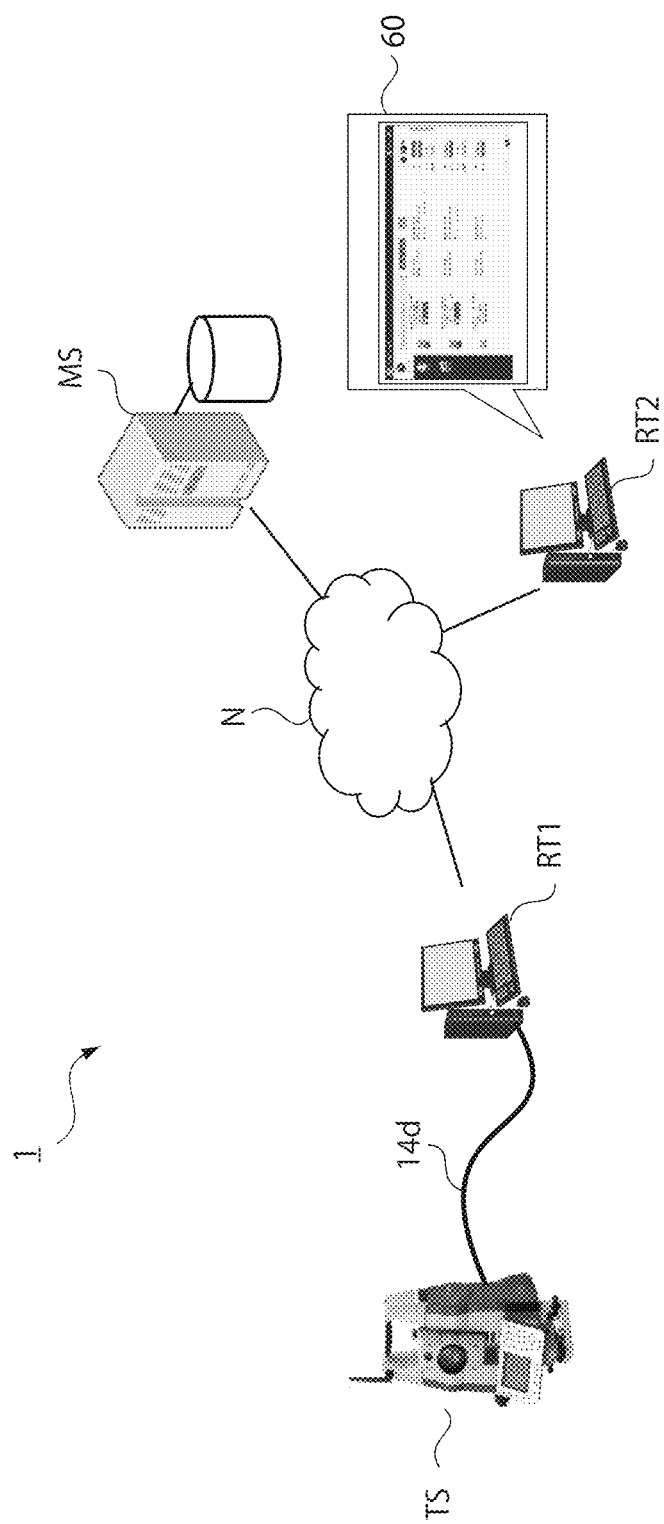
FIG. 1 is a view illustrating an entire configuration of a communication management system according to a first embodiment of the present invention.

FIG. 1 is a view illustrating an entire configuration of a communication management system (hereinafter, also simply referred to as "system") 1 according to an embodiment of the present invention. The system 1 includes a surveying instrument TS, a first remote terminal (hereinafter, referred to as "first terminal") RT1, a second remote terminal (hereinafter, referred to as "second terminal") RT2, and a management server MS.

The management server MS, the first terminal RT1, and the second terminal RT2 can communicate with each other through a communication network N. The communication network N may include arbitrary communication networks including a local area network such as an internal LAN and a satellite communication network.

(Configuration of Surveying Instrument)

Figure 2:
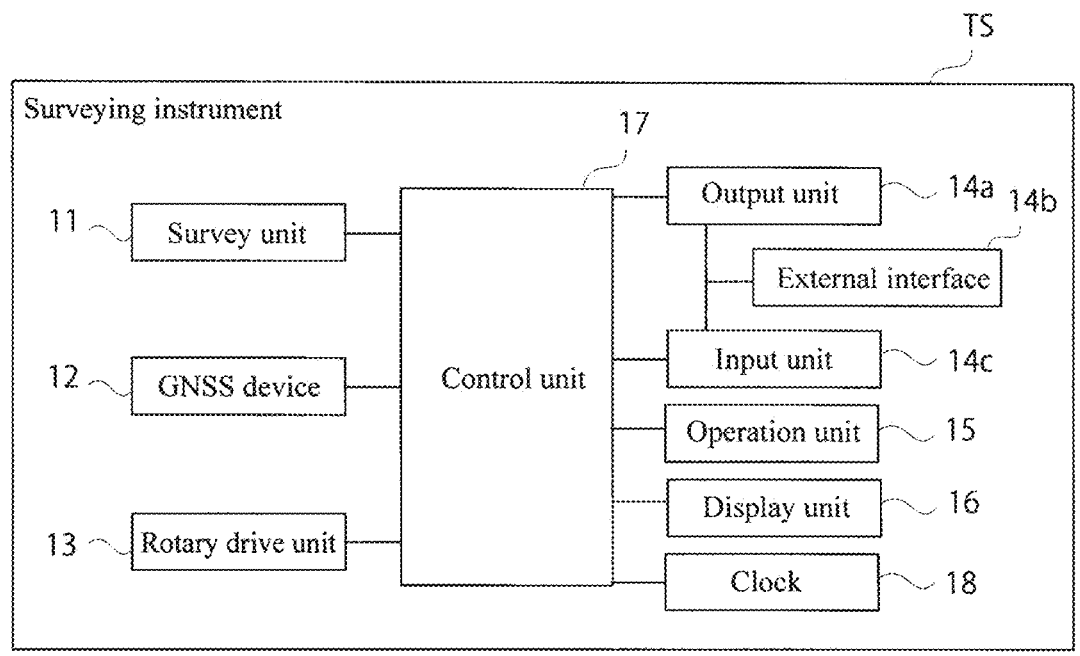
FIG. 2 is a configuration block diagram of a surveying instrument according to the same embodiment.

FIG. 2 is a configuration block diagram of the surveying instrument TS according to the embodiment. In the present embodiment, the surveying instrument TS is a total station (electronic distance and angle measuring instrument). As illustrated in FIG. 2, the surveying instrument TS includes a survey unit 11, a GNSS device 12, a rotary drive unit 13, an output unit 14a, an external interface 14b, an input unit 14c, a display unit 16, a control unit 17, and a clock 18. The components are connected to the control unit 17.

The survey unit 11 includes a light emitting element, a distance-measuring optical system, and a light receiving element disposed inside a telescope (not illustrated) of the surveying instrument TS. The survey unit 11 emits distance-measuring light from the light emitting element via the distance-measuring optical system and receives reflected light from a target by the light receiving element to measure a distance to the target. The survey unit 11 measures a vertical rotation angle of the telescope and a horizontal rotation angle of a housing (not illustrated) of the telescope by rotary encoders.

The GNSS device 12 receives a navigation signal from a navigation satellite, and acquires positional information (a time, a latitude, a longitude, and an altitude) of the surveying instrument TS. The rotary drive unit 13 is a motor, including a motor to vertically rotate the telescope and a motor to horizontally rotate the housing.

The output unit 14a, the external interface 14b, and the input unit 14c enable data transmission and reception without the communication network N. The output unit 14a outputs positional information acquired by the GNSS device 12 and specific information of the surveying instrument TS through the external interface 14b. Here, specific information of the surveying instrument TS is identification information of the surveying instrument TS including a model name (model number), a serial number, etc., and is specifically provided to the surveying instrument TS at the time of manufacturing.

The input unit 14c inputs an operation execution program and a response signal transmitted from the first terminal RT1 through the external interface 14b. In the present embodiment, the external interface 14b is a USB port.

The operation unit 15 includes a touch panel and a keyboard, etc., and accepts input operations from a user. The display unit 16 is a liquid crystal display, etc., and displays various information on a survey. The clock 18 measures a current time of the surveying instrument TS.

The control unit 17 is a control unit including at least a CPU and a memory (ROM, RAM, etc.). The control unit 17 executes a survey application program and displays a screen according to the application on the display unit 16. The control unit 17 acquires survey data of a measurement point by performing automatic leveling, a distance measurement and an angle measurement of a target by driving the survey unit 11 and the rotary drive unit 13.

The control unit 17 receives an operation execution program from the first terminal RT1 and installs the operation execution program in the surveying instrument TS when the control unit 17 is connected to the first terminal RT1 by the connection cable (USB cable) 14d through the external interface 14b. The control unit 17 executes the installed operation execution program. Details of the operation execution program will be described later. In the memory of the control unit 17, various programs for the processing described above and various data concerning the surveying instrument TS are stored.

(Configuration of First Terminal)

Figure 3:
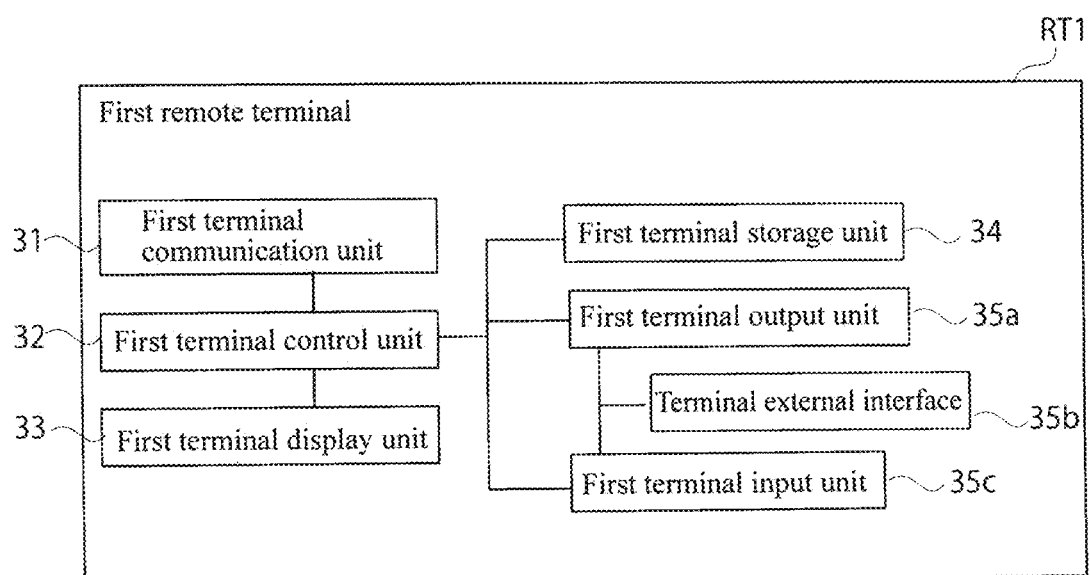
FIG. 3 is a configuration block diagram of a first remote terminal according to the same embodiment.

FIG. 3 is a configuration block diagram of the first terminal RT1. The first terminal RT1 is, for example, a personal computer, a smartphone, a tablet, etc. The first terminal RT1 includes a first terminal communication unit 31, a first terminal control unit 32, a first terminal display unit 33, a first terminal storage unit 34, a first terminal output unit 35a, a terminal external interface 35b, and a first terminal input unit 35c.

The first terminal communication unit 31 can transmit and receive information to and from a server communication unit 51 of the management server MS described later, through the communication network N.

The first terminal control unit 32 is a control unit including at least a CPU and a memory (ROM, RAM, etc.). The first terminal control unit 32 transmits an operation execution program for making the surveying instrument TS execute a predetermined operation to the surveying instrument TS when communication between the first terminal RT1 and the surveying instrument TS is established through the terminal external interface 35b.

The first terminal display unit 33 is, for example, a liquid crystal display, and displays various information according to control of the first terminal control unit 32. The first terminal storage unit 34 is, for example, an HDD, and stores an operation execution program that is transmitted to the surveying instrument TS when the first terminal RT1 and the surveying instrument TS are connected to each other.

The first terminal output unit 35a, the terminal external interface 35b, and the first terminal input unit 35c enable input/output of data without the communication network N. The terminal external interface 35b is a USB port. The surveying instrument TS and the first terminal RT1 are configured so as to be capable of communicating with each other through their respective external interfaces 14b and 35b by using a connection cable (USB cable) 14d.

(Configuration of Second Terminal)

Figure 4:
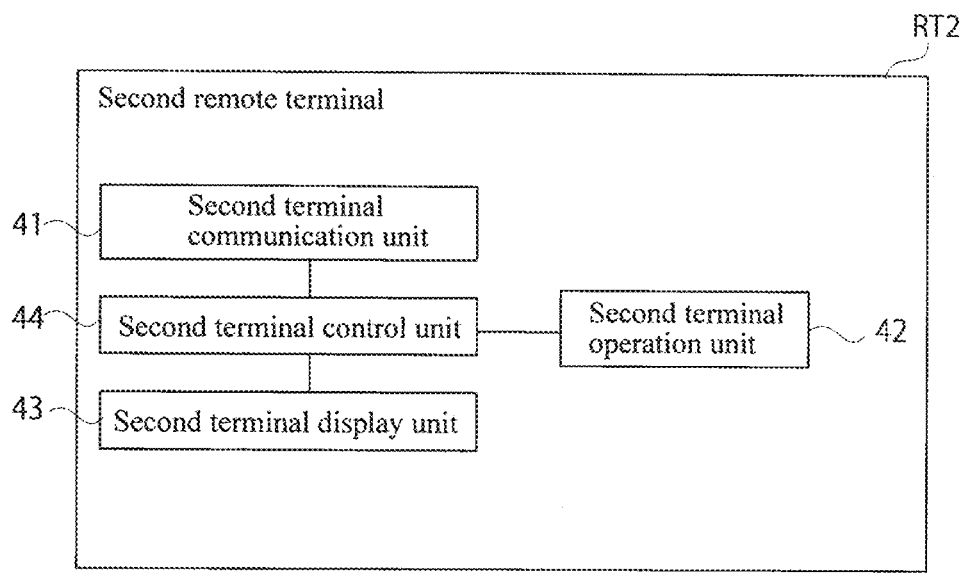
FIG. 4 is a configuration block diagram of a second remote terminal according to the same embodiment.

FIG. 4 is a configuration block diagram of the second terminal RT2. The second terminal RT2 is also, for example, a personal computer, a smartphone, a tablet, etc. The second terminal RT2 includes at least a second terminal communication unit 41, a second terminal operation unit 42, a second terminal display unit 43, and a second terminal control unit 44.

The second terminal communication unit 41 can transmit and receive information to and from a server communication unit 51 of the management server MS described later, through the communication network N.

The second terminal operation unit 42 is, for example, a keyboard, a mouse, etc., and as described later, a condition for an operation to be executed by the management server MS with respect to data acquired from the surveying instrument TS can be set with the second terminal operation unit 42 through a webpage 60.

The second terminal display unit 43 is, for example, a liquid crystal display, and displays the webpage 60 according to control of the second terminal control unit 44.

The second terminal control unit 44 is a control unit including at least a CPU and a memory (ROM, RAM, etc.). The second terminal control unit 44 sets a usable range of the surveying instrument TS as map information (a latitude and a longitude). In addition, the second terminal control unit 44 sets determination on entrance and exit of the surveying instrument TS into and from the set usable range. Further, the second terminal control unit 44 sets an operation with respect to a result of the determination. Details of setting by the second terminal control unit 44 will be described later.

The first terminal RT1 and the second terminal RT2 do not have to be separate remote terminals, and the first terminal RT1 may be configured so as to perform the functions of the second terminal RT2.

(Configuration of Management Server)

Figure 5:
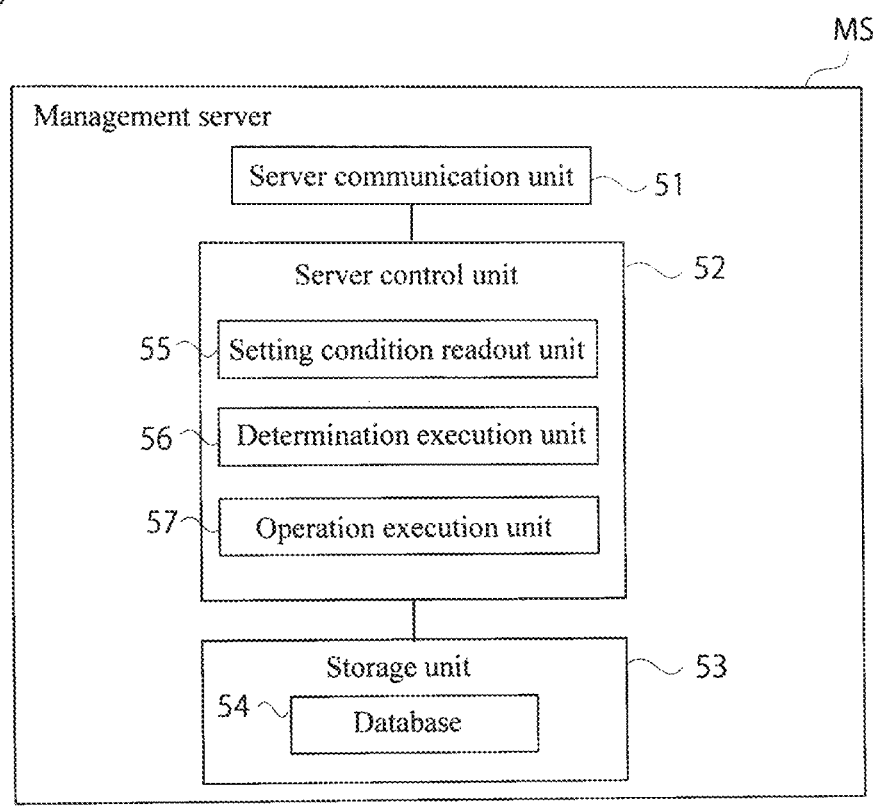
FIG. 5 is a configuration block diagram of a management server according to the same embodiment.

FIG. 5 is a configuration block diagram of the management server MS according to the embodiment. The management server MS includes at least a server communication unit 51, a server control unit 52, and a server storage unit 53.

The server communication unit 51 can transmit and receive information to and from each of the first terminal communication unit 31 and the second terminal communication unit 41 through the communication network N.

The server storage unit 53 includes a database 54. The database 54 stores a correspondence table between management numbers and specific information of surveying instruments. In addition, in the database 54, settings of processing of the management server MS with respect to the surveying instrument TS set by the second terminal RT and information received from the surveying instrument TS through the first terminal RT1 are stored in association with the management number of the surveying instrument TS.

The server control unit 52 is a control unit including at least a CPU and a memory (ROM, RAM, etc.). The server control unit 52 includes a setting condition readout unit 55, a determination execution unit 56, and an operation execution unit 57. The setting condition readout unit 55 reads out a predetermined condition set in the second terminal RT2 and stored in the database 54. Specifically, a condition of the usable range of the surveying instrument TS is read out.

The determination execution unit 56 compares map coordinates (a latitude and a longitude) of the usable range of the surveying instrument TS with GPS coordinates (a latitude and a longitude) of the surveying instrument TS, and based on determination criteria transmitted from the management server MS and stored in the database 54, determines entrance and exit of the surveying instrument TS into and from the usable range, and the operation execution unit 57 reads out an operation stored in the database 54, and based on the result of the determination made by the determination execution unit 56, executes a set operation. Details of the operation will be described later.

(Processing of Communication Management System)

Next, processings of the surveying instrument TS, the first terminal RT1, the second terminal RT2, and the management server MS are described with reference to FIGS. 6 to 10.

(Operation when Setting)

Figure 6:
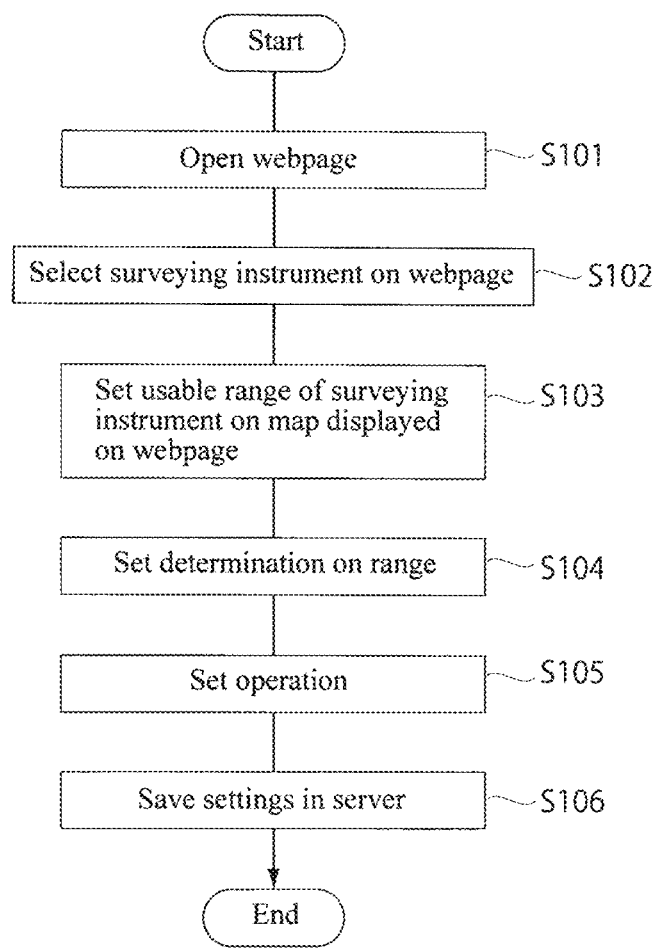
FIG. 6 is a flowchart when setting the communication management system according to the same embodiment.

FIG. 6 is a flowchart of processing by the second terminal control unit 44 when setting the system 1.

First, in Step S101, an administrator of the surveying instrument TS logs into an exclusive webpage 60 provided by a surveying instrument manufacturer from the second terminal RT2.

Next, in Step S102, the administrator selects a surveying instrument TS as a management target from a list of a plurality of surveying instruments registered in advance displayed on the second terminal display unit 43. To the surveying instrument TS, a management number has been provided for management on the webpage 60.

Next, in Step S103, the second terminal control unit 44 reads out a map stored in the second terminal storage unit (not illustrated) or acquired through the Internet, and displays the map on the webpage 60. On the webpage 60, an interface to specify a usable range of the surveying instrument TS is implemented by a layer superimposed on the map image. The displayed map can be changed in position or scale. The administrator sets a usable range of the surveying instrument TS on the map displayed on the webpage 60.

Figure 7:
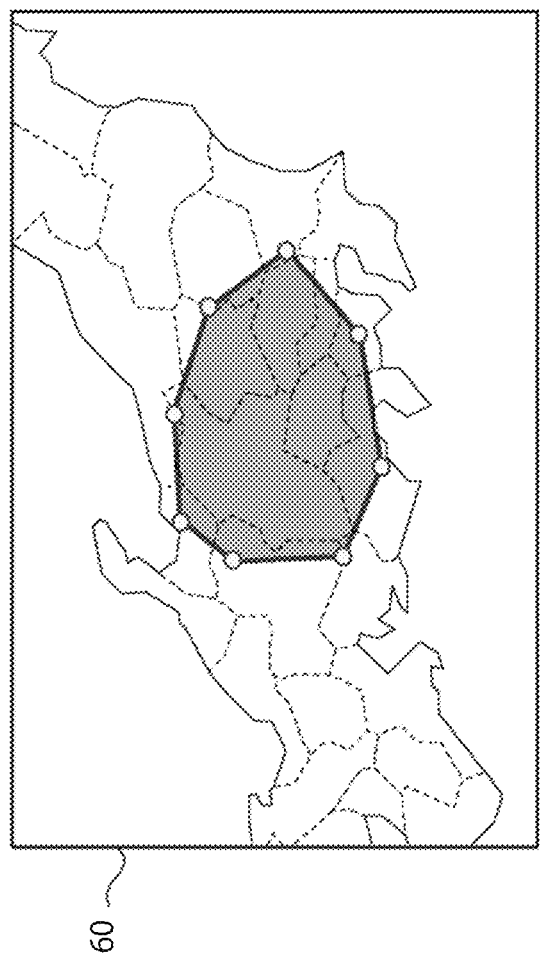
FIG. 7 illustrates an example of a webpage at the time of setting described above.

FIG. 7 illustrates an example of the webpage 60 at the time of setting, and is a setting example of a usable range of the surveying instrument TS. A usable range of the surveying instrument TS can be set to be an arbitrary range by a polygon drawn by clicking a mouse or a figure drawn freehand, as illustrated in FIG. 7.

Next, in Step S104, the second terminal control unit 44 displays a setting field for determination on the usable range set in Step S103 on the webpage 60. In the setting field, for example, a plurality of options are displayed so as to be selectable by a pull-down menu method or check boxes. As options, for example, "When outside the range," "When inside the range," and "When outside the range from inside the range" and "when returning inside the range from outside the range," etc., are displayed. The configuration may be made so that the administrator can arbitrarily add options. The administrator sets determination (determination criteria) according to his/her own management intentions.

Next, in Step S105, the second terminal control unit 44 displays a setting field for an operation with respect to determination set in Step S104 on the webpage 60. In the setting field for an operation, for example, a plurality of options are displayed so as to be selectable by a pull-down menu method or check boxes. As options, for example, "Send notification to registered e-mail address," "Notify on webpage," "Display warning on surveying instrument" and "Lock (suspend functions of) surveying instrument," etc., are displayed. The configuration may be made so that the administrator can arbitrarily add options. The administrator sets an operation according to his/her own management intentions.

Next, in Step S106, the second terminal control unit 44 transmits information on the usable range, the determination, and the operation set in Steps S103 to S105 described above to the management server MS through the second terminal communication unit 41. At this time, the management server MS stores these settings in the database 54. The second terminal control unit 44 ends the setting program when receiving a normal reception response from the management server MS.

(Operation During Connection)

Figure 8:
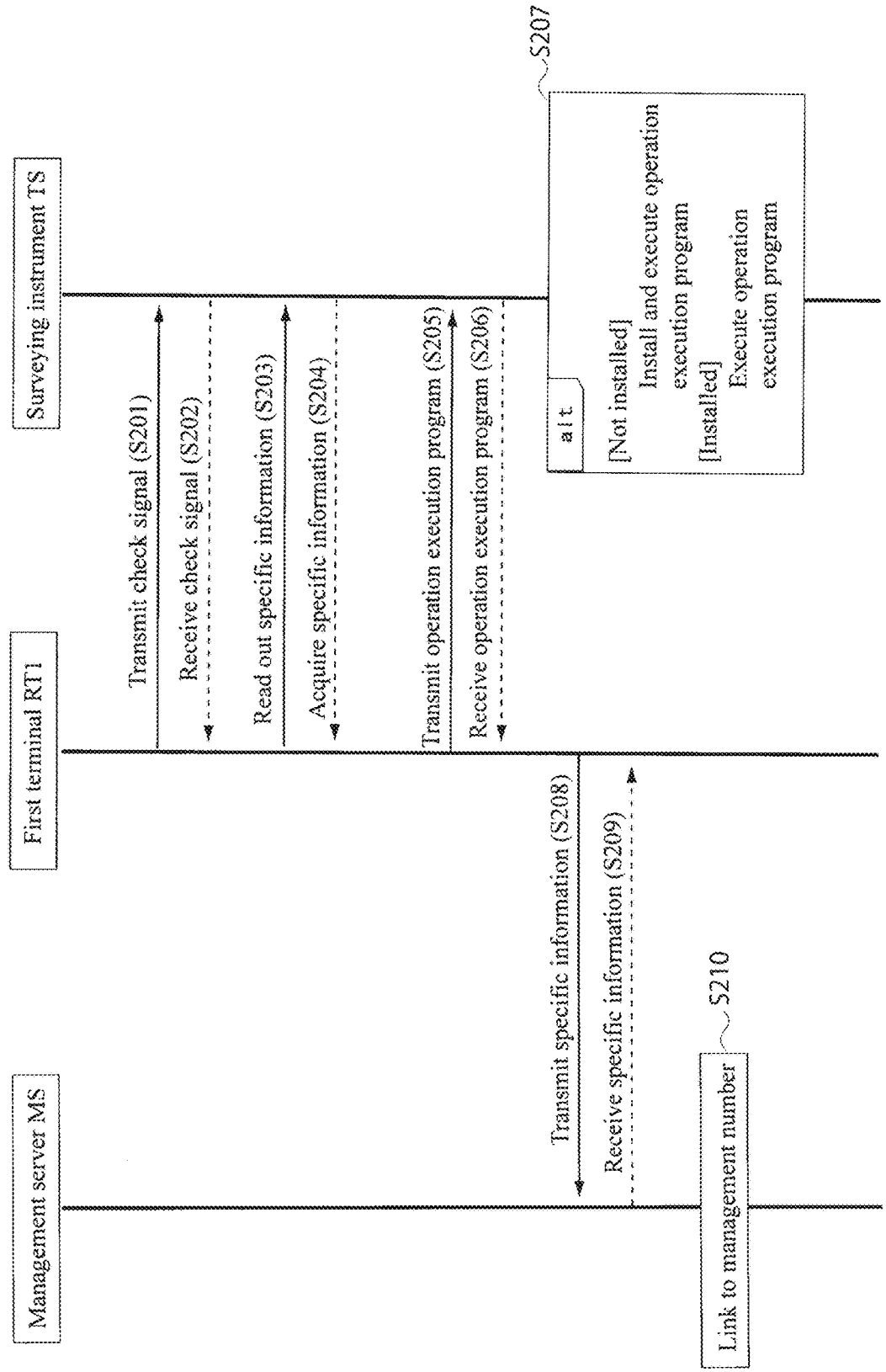
FIG. 8 is a schematic view of processing of the communication management system according to the same embodiment when the first remote terminal and the surveying instrument are connected to each other.

FIG. 8 is a schematic view of processing of the system 1 when the first terminal RT1 and the surveying instrument TS are connected to each other.

When the surveying instrument TS is connected to the first terminal RT1 through their respective external interfaces 14b and 35 by using a connection cable, processing starts, and in Step S201, the first terminal RT1 transmits a connection check signal to the surveying instrument TS, and in Step S202, the surveying instrument TS makes a reception response.

Then, when the connection between the first terminal RT and the surveying instrument TS is established, the first terminal RT1 reads out specific information of the surveying instrument TS from the surveying instrument TS in Step S203, and acquires the specific information in Step S204.

Next, in Step S205, the first terminal control unit 32 of the first terminal RT1 transmits an operation execution program for making the surveying instrument TS execute a predetermined operation in the form of a self-extracting file to the surveying instrument TS. The operation execution program includes a first operation execution program for making the surveying instrument TS execute an operation to automatically transmit the surveying instrument's own positional information to the first terminal RT1 at a constant frequency such as once an hour or at least once a day when a power supply of the surveying instrument TS is turned ON, and a second operation execution program for determining whether a defined period of time has elapsed from a time of data communication with the management server MS through the first terminal RT1 and locking functions of the surveying instrument TS.

In Step S206, when the surveying instrument TS makes an operation execution program reception response, in Step S207, in a case where the operation execution program has not been installed in the surveying instrument TS yet, a decompression program starts and the operation execution program is installed in the surveying instrument TS, and the operation execution program is executed. On the other hand, in a case where the operation execution program has already been installed, installation is not performed, and the installed operation execution program is executed.

In the meantime, in Step S208, the first terminal RT1 transmits the specific information of the surveying instrument TS received in S203 to the management server MS, and in Step S209, the management server MS makes a reception response.

When the management server MS receives the specific information of the surveying instrument TS, in Step S210, the server control unit 52 searches for the management number from the correspondence table between the specific information and the management number of the surveying instrument TS stored in the database 54, and links the management number provided to the surveying instrument TS to the specific information of the surveying instrument TS, and ends the processing.

(Processing when Executing First Operation)

Figure 9:
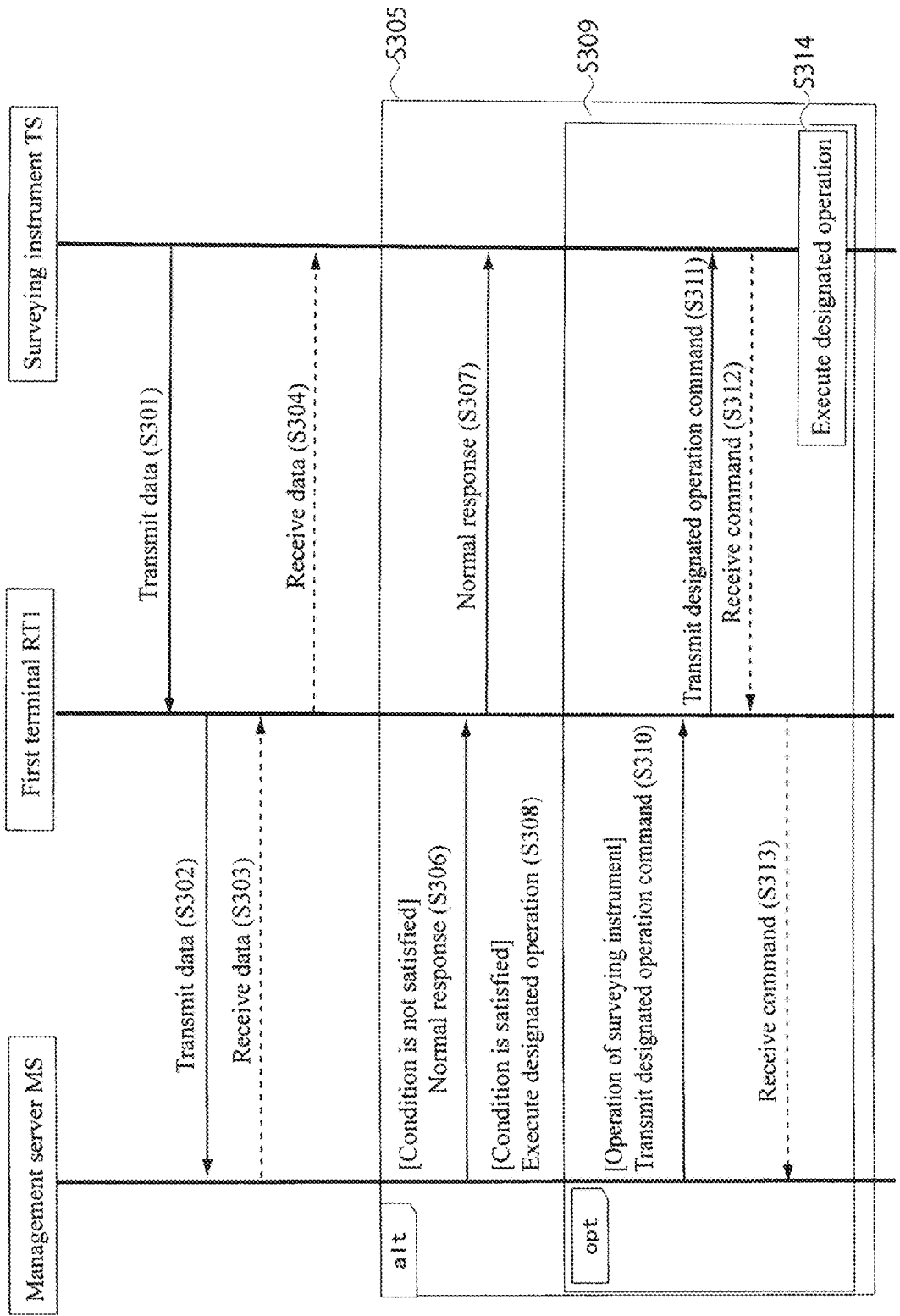
FIG. 9 is a schematic view of processing of the communication management system according to the same embodiment when the surveying instrument executes an operation according to a first operation execution program.

FIG. 9 is a schematic view of an operation of the system 1 when the surveying instrument TS executes the first operation execution program. The surveying instrument TS performs the following operation according to the first operation execution program at a constant frequency such as once an hour, at least once a day, or each time when the power supply of the surveying instrument TS is turned ON.

When processing starts, in Step S301, the surveying instrument TS transmits data to the first terminal RT1 according to the operation based on the operation execution program. Specifically, the surveying instrument TS associates its own positional information with the specific information and transmits the information to the first terminal RT1.

The first terminal RT1 transmits the data received from the surveying instrument TS to the management server MS in Step S302.

Next, in Step S303, the management server MS makes a reception response, and in Step S304, the first terminal RT1 returns the reception response to the surveying instrument TS. The server control unit 52 of the management server MS associates the received data with the management number of the surveying instrument TS and stores these in the database 53.

Next, in Step S305, the setting condition readout unit 55 reads out a usable range associated with the management number of the surveying instrument TS and stored from the database 53, and the determination execution unit 56 determines entrance or exit of the surveying instrument TS into or from the usable range. When a determination condition is not satisfied (No), the management server MS makes a normal response in Step S306, and the first terminal RT1 returns this normal response to the surveying instrument TS and ends the processing in Step S307.

On the other hand, when the predetermined condition is satisfied, the operation execution unit 57 executes the designated operation in Step S308.

In Step S308, when the designated operation is specifically an operation to be executed by the surveying instrument TS, such as "Display warning on surveying instrument" or "Lock (suspend functions of) surveying instrument," in Step S310, the operation execution unit 57 transmits a designated operation execution command to the first terminal RT1, and in Step S311, the first terminal RT1 transmits this to the surveying instrument TS.

When receiving the command, the surveying instrument TS transmits a reception response to the first terminal RT1 in Step S312, and in Step S313, the first terminal RT1 transmits this reception response to the management server MS. Next, the surveying instrument TS executes the designated operation in Step S314.

In each of the steps for the data transmission and reception and the reception response, the control unit 17 of the surveying instrument TS stores the time in the memory.

(Processing when Executing Second Operation)

Figure 10:
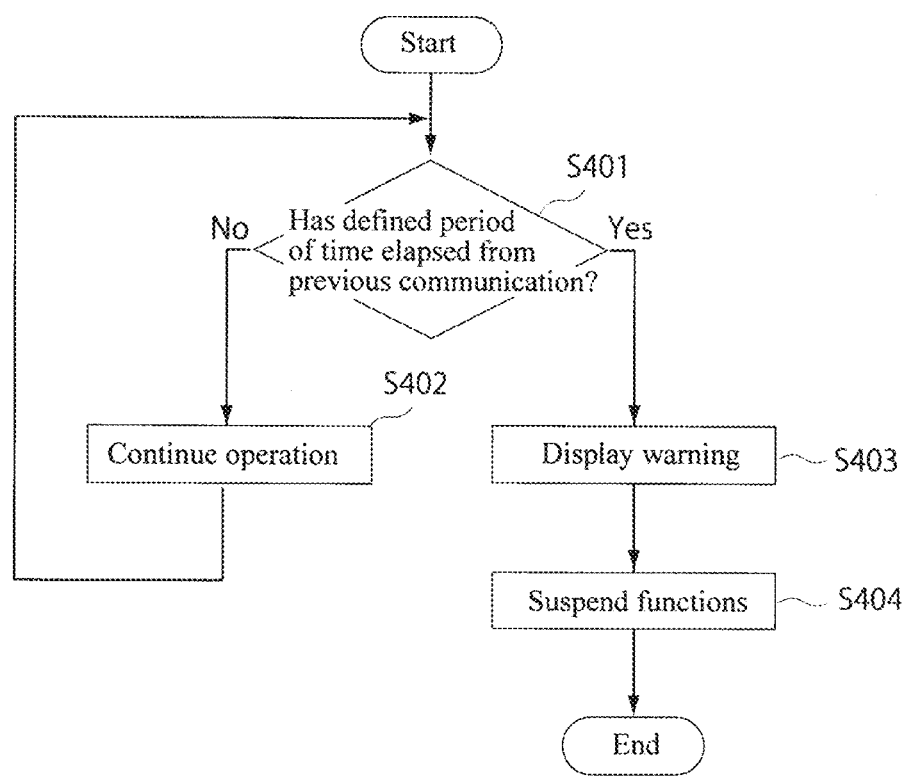
FIG. 10 is a flowchart of processing of the communication management system according to the same embodiment when the surveying instrument executes an operation according to a second operation execution program.

FIG. 10 is a flowchart of processing of the surveying instrument TS when executing the second operation execution program. The surveying instrument TS always performs processing illustrated in FIG. 10 by executing the second operation execution program.

When processing starts, in Step S401, the control unit 17 of the surveying instrument TS compares at least one time selected among the time of reception of the data reception response from the management server MS in the previous Step S304, the time of reception of the normal response from the management server MS in the previous Step S307, and the time of reception of the designated operation command from the management server MS in the previous Step S311 (hereinafter, these operations are collectively referred to as "previous communication"), with a current time, and determines whether a defined period of time has elapsed from the previous communication.

When the defined period of time does not elapse (No), the control unit 17 determines that communication with the management server MS has been normally made, and shifts the processing to Step S402, continues the operation according to the first operation execution program, and returns the processing to Step S401.

When the defined period of time elapses (Yes), the control unit 17 determines that the defined period of time has elapsed in a state where the communication with the management server MS is disconnected so that the surveying instrument TS is not normally managed. Then, in Step S403 and the control unit 17 displays a warning on the display unit 16, and, in Step S404, locks the functions and ends the processing.

A usage example of the system 1 according to the present embodiment is given. Given is an example in which an administrator who possesses the surveying instrument TS uses the system 1 in order to prevent the surveying instrument 71 from being moved out of the vicinity of the site.

(1) The administrator opens the webpage 60 on the second terminal RT2, and sets "Usable range: 100 m radius from center of site," "Determination: When outside the range," "Operation: Display warning on surveying instrument TS, lock functions, and notify administrator by e-mail," saves these settings, and closes the webpage 60.

(2) A user connects the first terminal RT1 and the surveying instrument TS by using a connection cable. Accordingly, the first operation execution program for transmitting positional information by the surveying instrument TS to the first terminal RT1 hourly, and the second operation execution program for locking functions of the surveying instrument TS when communication between the surveying instrument TS and the management server MS is not made within the defined period of time, are installed in the surveying instrument TS.

(3) The surveying instrument TS transmits its own positional information to the management server MS through the first terminal RT1 hourly. When receiving the positional information, based on GNSS coordinates, the management server MS compares a position of the surveying instrument TS with the usable range designated in (1). When the surveying instrument TS is used within the range, the management server MS transmits a normal response to the surveying instrument TS through the first terminal RT1, and the user can normally use the surveying instrument TS.

(4) On the other hand, when use outside the range is detected, based on the operation set in (1), the management server MS transmits a command to display a warning on the surveying instrument TS, lock functions to the surveying instrument TS through the first terminal RT1, and notify the administrator that the surveying instrument TS is being used outside the range. The surveying instrument TS that received the command from the management server MS displays a warning on the display unit 16, and stops operations (locks functions) other than an operation of turning OFF the power supply.

(5) When the defined period of time elapses from the previous communication between the surveying instrument TS and the management server MS, the surveying instrument TS displays a warning on the display unit 16 and stops operations (locks functions) other than an operation of turning OFF the power supply.

The system 1 is configured so that, when the first terminal RT1 is connected to the surveying instrument TS, a first operation execution program for making the surveying instrument TS execute, as a predetermined operation, for example, an operation of outputting predetermined data (positional information) to the first terminal RT1 is installed in the surveying instrument TS, the first terminal RT1 transmits the data input from the surveying instrument TS to the management server MS, and outputs data received from the management server MS to the surveying instrument TS.

Therefore, even when the surveying instrument TS itself does not include a communication unit to make communication through a communication network to which the management server MS is connected, the surveying instrument TS can communicate data with the management server MS through the first terminal RT1. As a result, as in the case of a state-of-the-art surveying instrument including a communication unit, the surveying instrument TS can be managed by the management server through the communication network so as not to be used without authorization or in an improper state.

The system 1 is configured so that when the first terminal RT1 and the surveying instrument TS are connected to each other, the second operation execution program is installed in the surveying instrument TS, the second operation execution program being for executing, as a predetermined operation, an operation of suspending functions of the surveying instrument TS in a case where communication between the surveying instrument TS and the management server MS is not made for a defined period of time, and functions of the surveying instrument TS are suspended when the defined period of time elapses from the previous communication between the surveying instrument TS and the management server MS through the first terminal RT1 based on execution of the first operation execution program.

Therefore, even when connection between the surveying instrument TS and the first terminal RT1 is disconnected, despite the administrator's intentions, use in a state where the surveying instrument TS is out of management of the management server MS as in the conventional example can be prevented. Further, even if an attempt is made to use the surveying instrument TS solely separated from the first terminal RT1 without authorization or improperly, the surveying instrument TS cannot be used, so that the surveying instrument TS can be prevented from being stolen and used without authorization or in an improper state.

The system 1 is configured so that specific information of the surveying instrument TS is linked to the management number that is registered in advance and is used when the administrator makes settings on the webpage 60, and data to be transmitted from the surveying instrument TS to the first terminal RT1 is associated with the specific information of the surveying instrument TS and transmitted to the management server MS.

When the management server MS applies the same management to all of surveying instruments connected through the communication network N, there is no need to identify the surveying instrument TS. However, as described above, by linking the specific information of the surveying instrument TS to the management number, the management server MS can identify the specific surveying instrument TS. On the webpage 60, the administrator who performs management setting can recognize the surveying instrument TS based only on the management number, so that labor of the administrator can be reduced.

In addition, the system 1 is configured so that, when installing the operation execution program in the surveying instrument TS, installation is performed only when the program is not yet installed, and the operation execution program is executed in a case where the program has already been installed.

Therefore, once the first terminal RT1 and the surveying instrument TS are connected to each other, at the time of the second and subsequent connections, there is no need to install the same operation execution program again, and the processing time can be shortened. In addition, in the cases of the second and subsequent connections, the operation execution program is executed, so that even when connection between the first terminal RT1 and the surveying instrument TS is temporarily disconnected, by reconnecting these before an elapse of a defined period of time after which functions of the surveying instrument TS are suspended, management by the management server can be continuously performed.

As described at the beginning of the embodiment, the example described above is an example of application to the communication management system configured so that positional information of the surveying instrument is transmitted to the management server at fixed time intervals, and the management server determines whether the surveying instrument deviates from the predetermined range, and based on the determination result, to take a measure such as locking of functions of the surveying instrument. For example, as communication management systems to which the present embodiment is applicable, the following can be used.

(a) As with the system described in JP2019-007903 A, a communication management system of a surveying instrument, configured so that a clock to acquire a current time is provided in a surveying instrument, the surveying instrument transmits its own operation start time and operation end time to a management server as a first predetermined operation, and the management server makes determination on a predetermined usable time of the surveying instrument based on the received time data, and based on the determination result, performs management such as locking of functions of the surveying instrument.

(b) As with the system described in JP2019-007904A, a communication management system configured so that a temperature sensor is provided in a surveying instrument, the surveying instrument transmits its own temperature information to a management server at fixed time intervals as a first predetermined operation, the management server determines whether the surveying instrument deviates from a predetermined temperature range based on the received temperature data, and based on the determination result, performs management such as locking of functions of the surveying instrument.

(c) A communication management system configured so that a surveying instrument transmits survey data to a management server for each survey or at fixed time intervals as a first predetermined operation, and the management server performs management so as to analyze or store the survey data.

(d) A communication management system configured so that a surveying instrument transmits machine logs and error information to a management server at fixed time intervals or when an error occurs as a first predetermined operation, and the management server performs maintenance and management based on received data.

Second Embodiment

Figure 11:
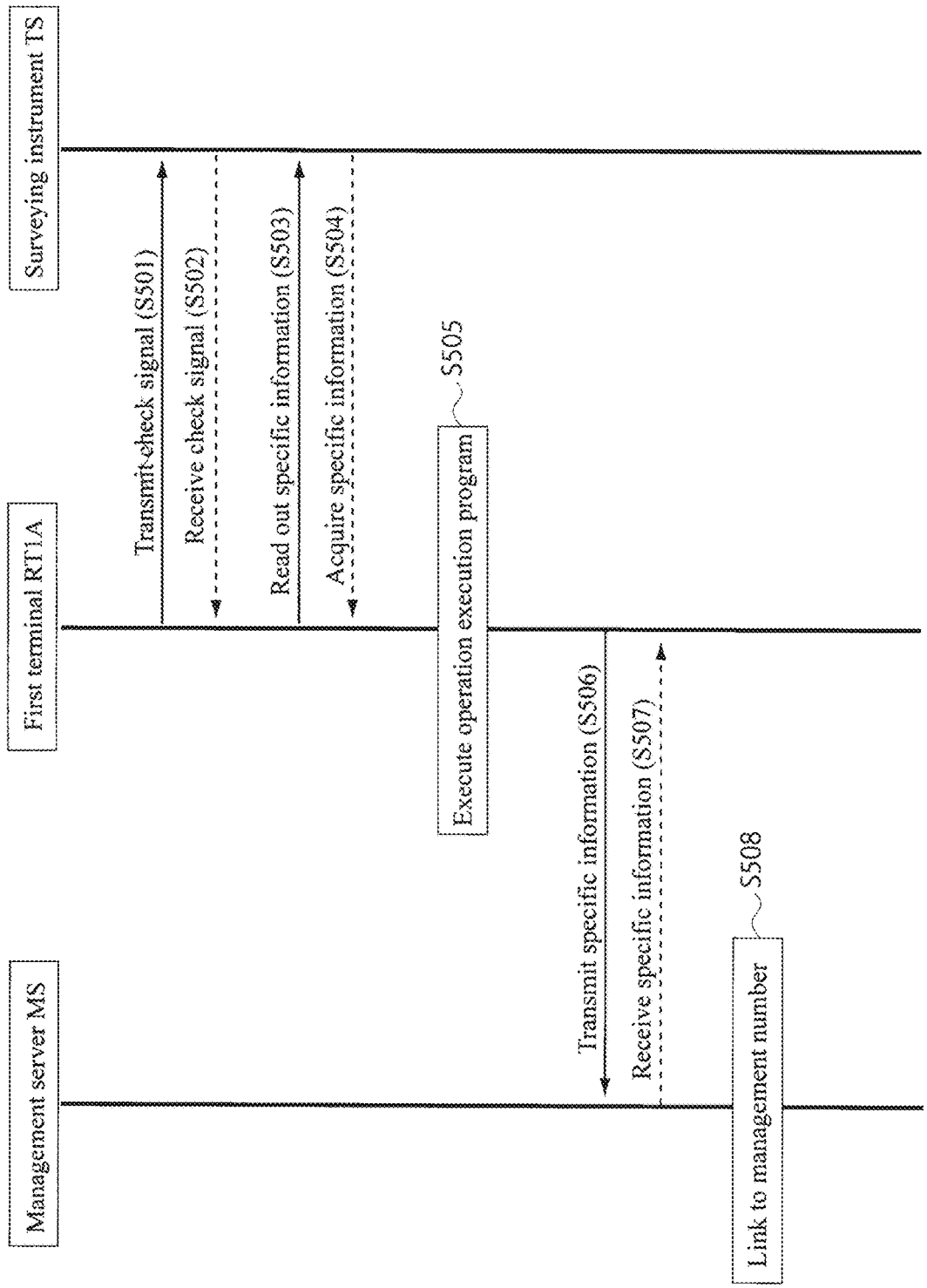
FIG. 11 is a schematic view of processing of a communication management system according to a second embodiment of the present invention when a first remote terminal and a surveying instrument are connected to each other.

A communication management system 1A for a surveying instrument according to a second embodiment includes, as illustrated in FIG. 11, a management server MS, a first terminal RT1A, a second terminal (not illustrated), and a surveying instrument TS. The system 1A has the same mechanical configuration as that of the system 1 except that, when the first terminal RT1A is connected to the surveying instrument TS through the terminal external interface 35b, the first terminal RT1A does not transmit an operation execution program to the surveying instrument TS and install the program in the surveying instrument, but the first terminal RT1A executes the operation execution program by itself.

FIG. 11 is a schematic view of processing of the system 1A when the first terminal RT1A and the surveying instrument TS are connected to each other. Hereinafter, an example of communication management as in the example of the first embodiment is described.

When the first terminal RT1A and the surveying instrument TS are connected to each other and processing starts, in Steps S501 to S504, as in Steps S201 to S204, checking of the connection and acquirement of specific information are performed.

Then, in Step S505, a first terminal control unit of the first terminal RT1A reads out an operation execution program stored in a first terminal storage unit and executes the program.

The operation execution program includes a first operation execution program for making the first terminal RT1A refer to positional information of the surveying instrument at a constant frequency such as once an hour, at least once a day, or each time when the power supply of the surveying instrument TS is turned ON, and a second operation execution program for determining whether a defined period of time has elapsed from the time of data communication of the first terminal RT1A with the management server MS and locking functions of the surveying instrument TS. Operations when executing the operation execution program will be described later.

Next, as with the first terminal RT1, the first terminal RT1A transmits the acquired specific information of the surveying instrument TS to the management server MS and receives a reception response in Steps S506 and S507. Then, in Step S508, the management server MS links the specific information to a management number as in Step S210.

Figure 12:
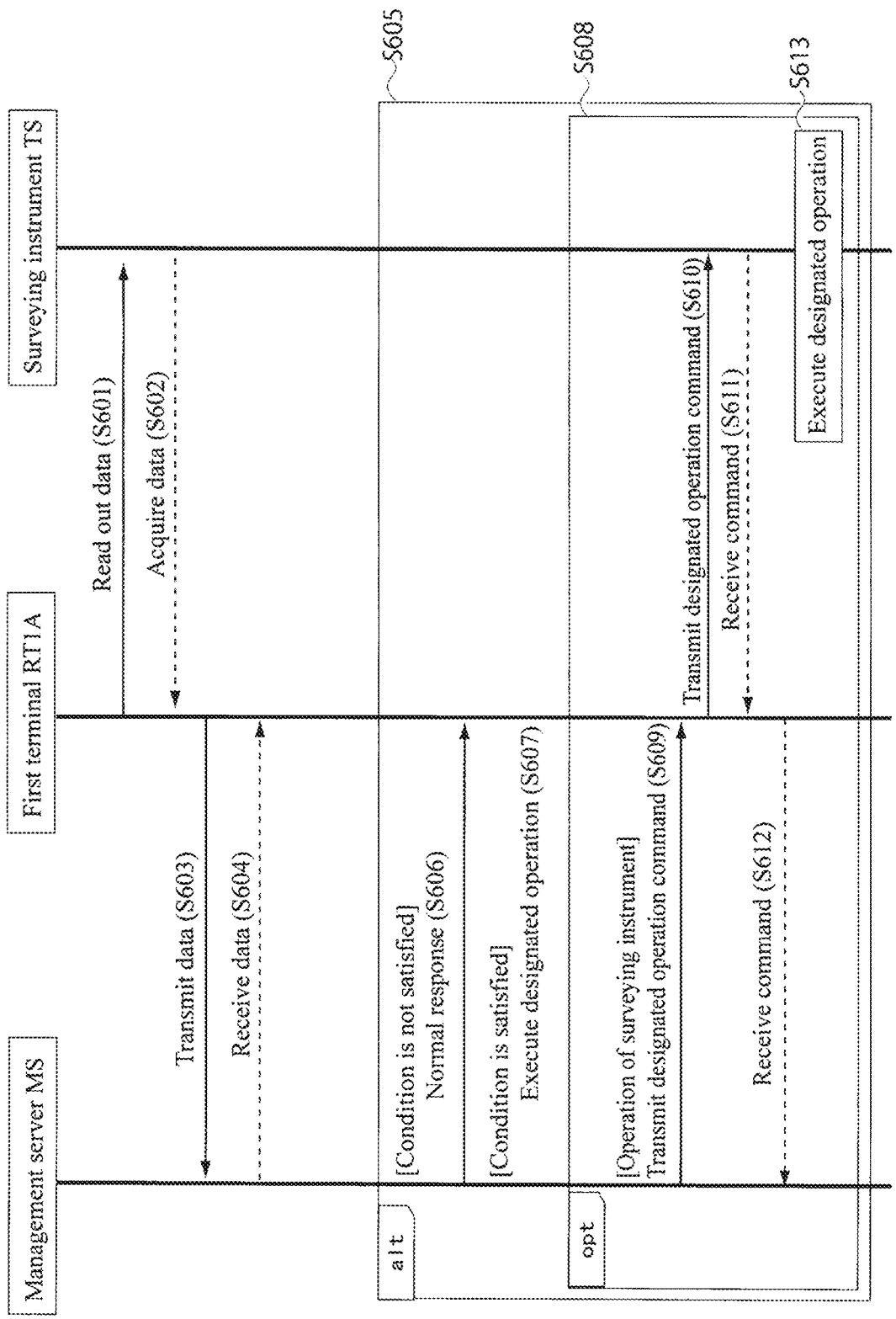
FIG. 12 is a schematic view of processing of the communication management system according to the same embodiment when the surveying instrument executes an operation according to a first operation execution program.

FIG. 12 is a view schematically illustrating processing when the first terminal RT1A executes the first operation execution program.

When starting processing, the first terminal RT1A refers to the surveying instrument TS in Step S601, and acquires data (positional information) from the surveying instrument TS in Step S602.

Next, the first terminal RT1A transmits the acquired data to the management server MS in Step S603, and the management server MS makes a reception response in Step S604.

Subsequent processing is the same as in the case of the system 1, so that description is omitted.

In the system 1A, the operation execution program is not installed in the surveying instrument TS, but is executed by the first terminal RT1A, and accordingly, the first terminal RT1A acquires data of the surveying instrument. The same processing is performed for the second operation execution program.

Thus, even in the configuration in which the operation execution program is not installed in the surveying instrument TS but is executed by the first remote terminal RT1A, as in the system 1, the surveying instrument TS is enabled to communicate data with the management server MS through the first terminal RT1 even if the surveying instrument TS itself does not include a communication unit for communication through a communication network to which the management server MS is connected. As a result, as with a state-of-the-art surveying instrument including a communication unit, the surveying instrument TS can be managed by the management server through a communication network so as not to be used without authorization or in an improper state.

In the system 1A, unlike the system 1, when connection between the surveying instrument TS and the first terminal RT1A is disconnected, functions of the surveying instrument TS cannot be locked even in a case where the management server MS does not communicate with the first terminal RT1A for a defined period of time. Therefore, it is also possible that only the second operation execution program is installed in the surveying instrument TS at the time of connection as a program to be executed by the surveying instrument TS as in the system 1.

Third Embodiment

Figure 13:
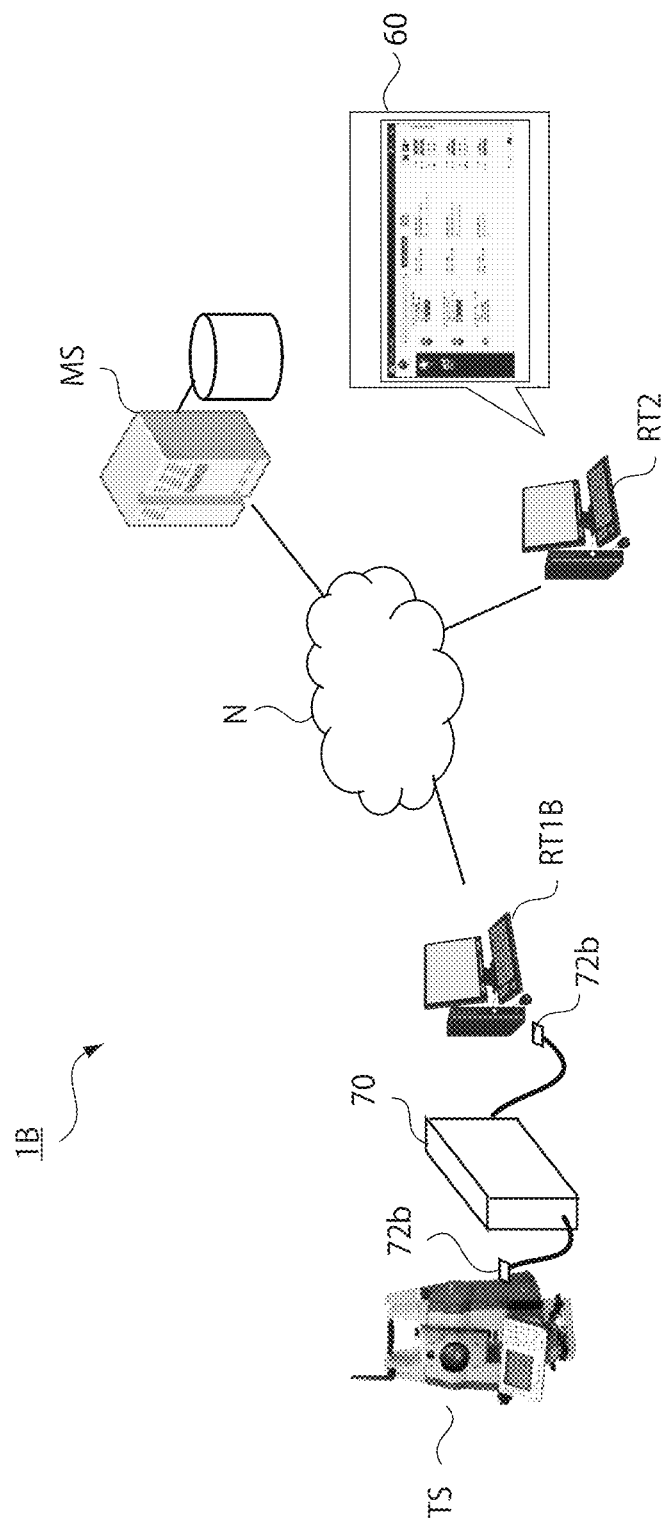
FIG. 13 is a view illustrating an entire configuration of a communication management system according to a third embodiment of the present invention.

FIG. 13 is a view illustrating an entire configuration of a management system 1B for a surveying instrument according to a third embodiment. The system 1B includes a management server MS, a first terminal RT1B, a second terminal RT2, and a surveying instrument TS which have the same mechanical configurations as in the system 1 except that the system 1B further includes a connection adapter (hereinafter, simply referred to as "adapter") 70 connectable to the surveying instrument TS and the first terminal RT1B respectively through external interfaces 14b and 35b. The first terminal RT1B according to the third embodiment does not have an operation execution program.

Figure 14:
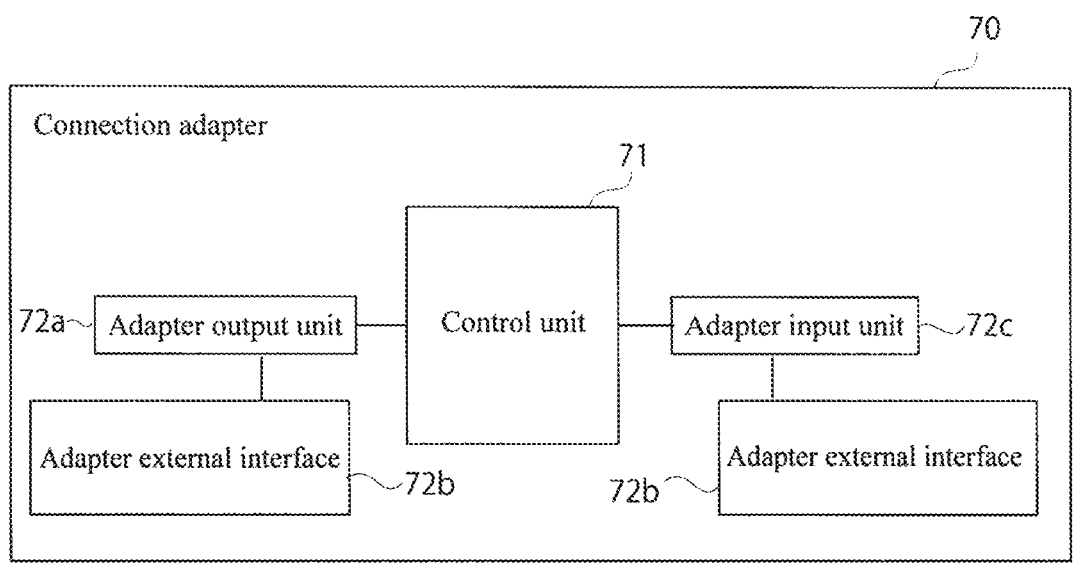
FIG. 14 is a configuration block diagram of a connection adapter according to the same embodiment.

As illustrated in FIG. 14, the adapter 70 includes an adapter control unit 71, an adapter output unit 72a, adapter external interfaces 72b, and an adapter input unit 72c.

The adapter control unit 71 is a control unit including a CPU and a memory (ROM, RAM, etc.). In the memory of the adapter control unit 71, an operation execution program for making the surveying instrument TS execute a predetermined operation as in the first embodiment is stored.

The adapter output unit 72a, the adapter external interfaces 72b, and the adapter input unit 72c enable data transmission and reception without a communication network N thereamong. The adapter external interfaces 72b are USB connectors, and provided one on each of the input side and the output side. Connecting the adapter external interfaces 72b to the external interface 14b of the surveying instrument TS and the external interface 35b of the first terminal RT1 enables communication between the surveying instrument TS and the first terminal RT1.

When the surveying instrument TS and the first terminal RT1 are connected to each other through the adapter 70, as with the first terminal control unit 32 in the system 1, the adapter control unit 71 transmits the operation execution program in a self-extracting format to the surveying instrument TS and installs the operation execution program in the surveying instrument TS.

Therefore, the adapter control unit 71 in the system 1B performs a role equivalent to the role of the terminal control unit 32 in the system 1.

Thus, the system 1B is configured so as to further includes the adapter 70 having the adapter control unit 71 and enables connection between the surveying instrument TS and the first terminal RT1B. And, when the surveying instrument TS and the first terminal RT1B are connected to each other through the adapter 70, the operation execution program is installed in the surveying instrument TS, so that even in a case where the first terminal RT1 does not have a special program and the surveying instrument TS does not have a communication function through a communication network N, the surveying instrument TS can be managed by the management server MS.

Instead of the configuration in which the adapter control unit 71 has an operation execution program for making the surveying instrument TS execute a predetermined operation, as with the first terminal RT1A in the system 1A, the first terminal RT1B may be configured so as to have an operation execution program for executing a predetermined operation, and made to execute the predetermined operation when the surveying instrument TS and the first terminal RT are connected to each other.

(Modification)

In the embodiment described above, an example in which a USB is used as an external interface to connect the surveying instrument TS to the first terminal RT1, RT1A, or RT1B is described, however, the external interface is not particularly limited, and Bluetooth® may be used, and various external interfaces to be connected with wires or wirelessly may be used.

Preferred embodiments of the present invention have been described above, and the embodiments described above are just examples of the present invention, and can be combined based on knowledge of a person skilled in the art, and such a combined embodiment is also included in the scope of the present invention.

EXPLANATION OF REFERENCE NUMERALS

1, 1A, 1B Communication management system
11 Survey unit
14b External interface
17 Control unit
32 First terminal control unit (terminal control unit)
35b Terminal external interface
60 Webpage
MS Management server
N Communication network
RT1, RT1A, RT1B First remote terminal (terminal)
RT2 Second remote terminal
TS Surveying instrument

What is claimed is:

1. A communication management system of a surveying instrument, comprising:
   a management server;
   a terminal including a terminal control unit and an external interface, and configured so as to be capable of communicating with the management server through a communication network; and
   a surveying instrument including a survey unit for surveying a measuring object, a control unit for controlling the survey unit, and an external interface, wherein when the surveying instrument and the terminal are connected to each other through their respective external interfaces, the terminal control unit makes the control unit install an operation execution program for executing a predetermined operation in the surveying instrument, the operation execution program includes a first operation execution program for outputting predetermined data to the terminal, the terminal transmits the data output from the surveying instrument by execution of the first operation execution program to the management server, and the management server manages the surveying instrument based on the data received from the terminal.

2. The communication management system of a surveying instrument according to claim 1, wherein the operation execution program includes a second operation execution program for suspending functions of the surveying instrument when a defined period of time elapses from the previous communication of the surveying instrument with the management server through the terminal.

3. The communication management system of a surveying instrument according to claim 1, wherein the data from the surveying instrument is associated with specific information of the surveying instrument and transmitted to the management server, and the management server manages the data by linking the specific information to a management number of the surveying instrument.

4. The communication management system of a surveying instrument according to claim 1, wherein each of the external interfaces of the surveying instrument and the terminal is a Universal Serial Bus or Bluetooth®.

5. A communication management system of a surveying instrument, comprising:
   a management server;
   a terminal including a terminal control unit, a communication unit capable of transmitting and receiving information to and from the management server through a communication network, and an external interface enabling data transmission and reception without the communication network; and
   a surveying instrument including a survey unit for surveying a measuring object, a control unit for controlling the survey unit, and an external interface enabling data transmission and reception without the communication network, wherein
   the surveying instrument does not include a communication unit capable of transmitting and receiving information to and from the management server through the communication network, and wherein
   when the surveying instrument and the terminal are connected to each other through their respective external interfaces, the terminal control unit executes an operation execution program for executing a predetermined operation, the operation execution program includes a first operation execution program for reading out predetermined data from the surveying instrument, the terminal transmits data acquired from the surveying instrument by execution of the first operation execution program to the management server, and
   the management server manages the surveying instrument based on data received from the terminal.

6. The communication management system of a surveying instrument according to claim 5, wherein the operation execution program includes a second operation execution program for suspending functions of the surveying instrument when a defined period of time elapses from the previous communication of the surveying instrument with the management server through the terminal.

7. The communication management system of a surveying instrument according to claim 5, wherein the data from the surveying instrument is associated with specific information of the surveying instrument and transmitted to the management server, and the management server manages the data by linking the specific information to a management number of the surveying instrument.

8. The communication management system of a surveying instrument according to claim 5, wherein each of the external interfaces of the surveying instrument and the terminal is a Universal Serial Bus or Bluetooth®.

9. A communication management system of a surveying instrument, comprising:
- a management server;
- a terminal configured including a terminal control unit and an external interface so as to be capable of communicating with the management server through a communication network;
- a surveying instrument including a survey unit for surveying a measuring object, a control unit for controlling the survey unit, and an external interface; and
- a connection adapter including an adapter control unit, an adapter input unit, and an adapter output unit, and configured so as to communicatively connect the surveying instrument and the terminal through the external interfaces,
- wherein when the surveying instrument and the terminal are connected to each other through the connection adapter, the connection adapter makes the control unit install a first operation execution program for executing a predetermined operation in the surveying instrument, or executes a first operation execution program for executing a predetermined operation, the terminal transmits the data acquired by execution of either of the programs to the management server, and the management server manages the surveying instrument based on data received from the terminal.

10. The communication management system of a surveying instrument according to claim 9, wherein the operation execution program includes a second operation execution program for suspending functions of the surveying instrument when a defined period of time elapses from the previous communication of the surveying instrument with the management server through the terminal.

11. The communication management system of a surveying instrument according to claim 9, wherein the data from the surveying instrument is associated with specific information of the surveying instrument and transmitted to the management server, and the management server manages the data by linking the specific information to a management number of the surveying instrument.

12. The communication management system of a surveying instrument according to claim 9, wherein each of the external interfaces of the surveying instrument and the terminal is a Universal Serial Bus or Bluetooth®.

* * * * *